(12) United States Patent
Castleman

(10) Patent No.: US 11,089,280 B2
(45) Date of Patent: Aug. 10, 2021

(54) APPARATUS AND METHOD FOR CAPTURING AND DISPLAYING SEGMENTED CONTENT

(71) Applicant: Sony Interactive Entertainment Inc., Tokyo (JP)

(72) Inventor: Dennis D. Castleman, Fremont, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 116 days.

(21) Appl. No.: 15/280,933

(22) Filed: Sep. 29, 2016

(65) Prior Publication Data

US 2018/0007339 A1 Jan. 4, 2018

Related U.S. Application Data

(60) Provisional application No. 62/357,259, filed on Jun. 30, 2016, provisional application No. 62/374,687, filed on Aug. 12, 2016.

(51) Int. Cl.
*H04N 13/156* (2018.01)
*H04N 13/243* (2018.01)
(Continued)

(52) U.S. Cl.
CPC ........... *H04N 13/156* (2018.05); *G06F 3/011* (2013.01); *G06F 3/012* (2013.01); *G06F 3/013* (2013.01);
(Continued)

(58) Field of Classification Search
CPC .. H04N 13/156; H04N 13/383; H04N 13/378; H04N 13/243; H04N 13/004;
(Continued)

(56) References Cited

U.S. PATENT DOCUMENTS 4,208,811 A 6/1980 Junowicz
6,331,869 B1 12/2001 Furlan
(Continued)

FOREIGN PATENT DOCUMENTS

CN 102413376 4/2012
CN 103562791 2/2014
(Continued)

OTHER PUBLICATIONS

Cig, Cagla & Sezgin, Tevfik Metin; "Gaze-Based Virtual Task Predictor", Gazeln'14, ACM, Nov. 16, 2014, 6 pages.
(Continued)

*Primary Examiner* — Boubacar Abdou Tchoussou
(74) *Attorney, Agent, or Firm* — Fitch, Even, Tabin & Flannery LLP

(57) ABSTRACT

A method for providing content includes determining a viewing direction of a user viewing a content item comprising a plurality of video streams, selecting two or more video streams of the content item based on the viewing direction of the user and directional data associated with the plurality of video streams, decoding the two or more video streams to form two or more decoded video streams, stitching the two or more decoded video streams to form a combined image, and causing the combined image to be displayed to the user. Systems perform similar steps and non-transitory computer readable storage mediums each store one or more computer programs.

19 Claims, 5 Drawing Sheets

(51) Int. Cl.

| | |
|---|---|
| *H04N 13/378* | (2018.01) |
| *H04N 13/383* | (2018.01) |
| *H04N 5/247* | (2006.01) |
| *H04N 21/81* | (2011.01) |
| *G06F 3/01* | (2006.01) |
| *H04L 29/06* | (2006.01) |
| *H04N 21/4223* | (2011.01) |
| *H04N 21/442* | (2011.01) |
| *H04N 21/441* | (2011.01) |
| *H04N 21/845* | (2011.01) |
| *H04N 21/2343* | (2011.01) |
| *H04N 21/6587* | (2011.01) |
| *H04N 21/4728* | (2011.01) |
| *H04N 21/482* | (2011.01) |
| *H04N 21/45* | (2011.01) |
| *H04N 21/2387* | (2011.01) |
| *H04N 21/435* | (2011.01) |
| *H04N 21/462* | (2011.01) |
| *G06F 3/0482* | (2013.01) |
| *G11B 20/10* | (2006.01) |
| *G11B 27/036* | (2006.01) |
| *G11B 27/10* | (2006.01) |
| *H04N 5/232* | (2006.01) |
| *H04N 5/265* | (2006.01) |

(52) U.S. Cl.
CPC ...... *G06F 3/0482* (2013.01); *G11B 20/10527* (2013.01); *G11B 27/036* (2013.01); *G11B 27/102* (2013.01); *H04L 65/4069* (2013.01); *H04L 65/4076* (2013.01); *H04L 65/4084* (2013.01); *H04L 65/602* (2013.01); *H04L 65/604* (2013.01); *H04L 65/80* (2013.01); *H04N 5/247* (2013.01); *H04N 13/243* (2018.05); *H04N 13/378* (2018.05); *H04N 13/383* (2018.05); *H04N 21/2343* (2013.01); *H04N 21/2387* (2013.01); *H04N 21/4223* (2013.01); *H04N 21/4355* (2013.01); *H04N 21/441* (2013.01); *H04N 21/44218* (2013.01); *H04N 21/4532* (2013.01); *H04N 21/4621* (2013.01); *H04N 21/4728* (2013.01); *H04N 21/482* (2013.01); *H04N 21/6587* (2013.01); *H04N 21/816* (2013.01); *H04N 21/845* (2013.01); *G11B 2020/1062* (2013.01); *H04N 5/23238* (2013.01); *H04N 5/265* (2013.01)

(58) Field of Classification Search
CPC ........... H04N 13/0242; H04N 13/0479; H04N 13/0484; H04N 21/4532; H04N 5/23238; H04N 5/265; G06F 3/012; G06F 3/013; G11B 27/102
See application file for complete search history.

(56) References Cited

U.S. PATENT DOCUMENTS

| | | | |
|---|---|---|---|
| 6,337,683 B1 | 1/2002 | Gilbert | |
| 6,362,842 B1 | 3/2002 | Tahara | |
| 6,559,846 B1 | 5/2003 | Uyttendaele | |
| 6,762,789 B1 | 7/2004 | Sogabe | |
| 6,788,333 B1* | 9/2004 | Uyttendaele | H04N 5/23238 348/36 |
| 7,778,485 B2* | 8/2010 | Zeineh | G02B 21/365 382/284 |
| 8,184,069 B1 | 5/2012 | Rhodes | |
| 8,487,959 B1 | 7/2013 | Khan | |
| 8,636,361 B2 | 1/2014 | Chen | |
| 8,914,305 B2 | 12/2014 | Buck | |
| 8,990,682 B1 | 3/2015 | Wong | |
| 9,462,230 B1 | 10/2016 | Agrawal | |
| 9,665,171 B1 | 5/2017 | Skogo | |
| 9,876,780 B2 | 1/2018 | Kuper | |
| 10,204,658 B2 | 2/2019 | Krishnan | |
| 10,341,658 B2 | 7/2019 | Peng | |
| 10,805,592 B2 | 10/2020 | Castleman | |
| 2002/0021353 A1 | 2/2002 | Denies | |
| 2003/0011619 A1 | 1/2003 | Jacobs | |
| 2003/0095155 A1 | 5/2003 | Johnson | |
| 2004/0239763 A1 | 12/2004 | Notea | |
| 2005/0273185 A1 | 12/2005 | Teiwes | |
| 2006/0045388 A1* | 3/2006 | Zeineh | G02B 21/365 382/312 |
| 2006/0256133 A1 | 11/2006 | Rosenberg | |
| 2007/0153023 A1 | 7/2007 | Chladny | |
| 2007/0188521 A1 | 8/2007 | Miller | |
| 2008/0036875 A1 | 2/2008 | Jones | |
| 2009/0074084 A1 | 3/2009 | Drezner | |
| 2009/0097710 A1 | 4/2009 | Sroka | |
| 2009/0129693 A1 | 5/2009 | Bloebaum | |
| 2009/0273710 A1 | 11/2009 | Pearlstein | |
| 2009/0278921 A1 | 11/2009 | Wilson | |
| 2010/0056274 A1 | 3/2010 | Uusitalo | |
| 2010/0066975 A1 | 3/2010 | Rehnstrom | |
| 2010/0169905 A1 | 7/2010 | Fukuchi | |
| 2012/0146891 A1 | 6/2012 | Kalinli | |
| 2012/0170642 A1 | 7/2012 | Braness | |
| 2012/0242781 A1 | 9/2012 | Gautier | |
| 2012/0262540 A1 | 10/2012 | Rondinelli | |
| 2012/0265856 A1 | 10/2012 | Major | |
| 2012/0295708 A1 | 11/2012 | Hernandez-Abrego | |
| 2012/0306933 A1 | 12/2012 | Osako | |
| 2012/0319928 A1 | 12/2012 | Rhodes | |
| 2013/0125155 A1 | 5/2013 | Bhagavathy | |
| 2013/0128364 A1 | 5/2013 | Wheeler | |
| 2013/0223537 A1 | 8/2013 | Kasai | |
| 2013/0266065 A1 | 10/2013 | Paczkowski | |
| 2013/0271565 A1 | 10/2013 | Chen | |
| 2013/0293672 A1 | 11/2013 | Suzuki | |
| 2013/0336547 A1 | 12/2013 | Komogortsev | |
| 2014/0085412 A1 | 3/2014 | Hayashi | |
| 2014/0087877 A1 | 3/2014 | Krishnan | |
| 2014/0096077 A1 | 4/2014 | Jacob | |
| 2014/0123162 A1 | 5/2014 | Karlsson | |
| 2014/0282750 A1 | 9/2014 | Civiletto | |
| 2014/0361977 A1 | 12/2014 | Stafford | |
| 2015/0002529 A1 | 1/2015 | Liu | |
| 2015/0012403 A1 | 1/2015 | Buck | |
| 2015/0061995 A1 | 3/2015 | Gustafsson | |
| 2015/0142884 A1 | 5/2015 | Veramendi | |
| 2015/0172544 A1 | 6/2015 | Deng | |
| 2015/0172621 A1 | 6/2015 | Thebault | |
| 2015/0193395 A1 | 7/2015 | Nicolaou | |
| 2015/0234457 A1 | 8/2015 | Kempinski | |
| 2015/0237336 A1 | 8/2015 | Sylvan | |
| 2015/0264299 A1 | 9/2015 | Leech | |
| 2015/0277710 A1 | 10/2015 | Lee | |
| 2016/0012855 A1 | 1/2016 | Krishnan | |
| 2016/0029091 A1 | 1/2016 | Le Floch | |
| 2016/0048964 A1 | 2/2016 | Kruglick | |
| 2016/0070344 A1 | 3/2016 | Gohl | |
| 2016/0286119 A1* | 9/2016 | Rondinelli | G03B 17/12 |
| 2016/0352791 A1 | 12/2016 | Adams | |
| 2016/0353090 A1* | 12/2016 | Esteban | H04N 13/044 |
| 2016/0360267 A1 | 12/2016 | Marilly | |
| 2016/0366365 A1 | 12/2016 | Iyer | |
| 2016/0379415 A1* | 12/2016 | Espeset | G06T 15/04 345/633 |
| 2017/0006220 A1* | 1/2017 | Adsumilli | H04N 5/23238 |
| 2017/0068312 A1 | 3/2017 | Mallinson | |
| 2017/0282062 A1 | 10/2017 | Black | |
| 2017/0364760 A1 | 12/2017 | Canella | |
| 2017/0366812 A1* | 12/2017 | Abbas | H04N 19/137 |
| 2018/0004285 A1 | 1/2018 | Castleman | |
| 2018/0007422 A1 | 1/2018 | Castleman | |

(56) References Cited

U.S. PATENT DOCUMENTS

| | | | |
|---|---|---|---|
| 2018/0075635 A1* | 3/2018 | Choi | G06T 11/60 |
| 2019/0108859 A1 | 4/2019 | Krishnan | |

FOREIGN PATENT DOCUMENTS

| | | |
|---|---|---|
| EP | 1064817 | 10/2005 |
| EP | 2434772 A1 | 3/2012 |
| EP | 2529811 | 12/2012 |
| IN | 2866CH2015 | 7/2015 |
| JP | H10271499 | 10/1998 |
| JP | 2002183212 | 6/2002 |
| JP | 2004056335 | 2/2004 |
| JP | 2006171822 | 6/2006 |
| JP | 2009027457 | 2/2009 |
| JP | 2011123349 | 6/2011 |
| JP | 2012070378 | 4/2012 |
| JP | 2012124784 | 6/2012 |
| JP | 2013012181 | 1/2013 |
| JP | 2014072608 | 4/2014 |
| JP | 2014075743 | 4/2014 |
| JP | 2015118448 | 6/2015 |
| JP | 2020123962 | 8/2020 |
| WO | 0008889 | 2/2000 |
| WO | 2012147303 A1 | 11/2012 |
| WO | 2015184416 | 12/2015 |

OTHER PUBLICATIONS

James, Paul; "Hands On: SMI Proves that Foveated Rendering is Here and it Really Works", Road to VR, https://www.roadtovr.com/hands-on-smi-proves-that-foveated-rendering-is-here-and-it-really-works/, Jan. 10, 2016, 6 pages.

Patent Cooperation Treaty; "International Search Report" issued in PCT/US17/35057, dated Aug. 23, 2017; 2 pages.

Patent Cooperation Treaty; "Notification of Transmittal of the International Search Report and the Written Opinion of the International Searching Authority, or the Declaration" issued in PCT/US17/35057, dated Aug. 23, 2017; 2 pages.

Patent Cooperation Treaty; "Written Opinion of the International Searching Authority" issued in PCT/US17/35057, dated Aug. 23, 2017; 14 pages.

Patent Cooperation Treaty; "International Search Report" issued in PCT Application No. PCT/US17/35058, dated Sep. 25, 2017, 4 pages.

Patent Cooperation Treaty; "International Search Report" issued in PCT Application No. PCT/US17/35060, dated Aug. 4, 2017, 2 pages.

Patent Cooperation Treaty; "Invitation to Pay Additional Fees and, Where Applicable, Protest Fee" issued in PCT Application No. PCT/US17/35058, mailed Aug. 3, 2017, 2 pages.

Patent Cooperation Treaty; "Notification of Transmittal of the International Search Report and the Written Opinion of the International Searching Authority, or the Declaration" issued in PCT Application No. PCT/US17/35058, dated Sep. 25, 2017, 2 pages.

Patent Cooperation Treaty; "Notification of Transmittal of the International Search Report and the Written Opinion of the International Searching Authority, or the Declaration" issued in PCT Application No. PCT/US17/35060, dated Aug. 4, 2017, 2 pages.

Patent Cooperation Treaty; "Written Opinion of the International Searching Authority" issued in PCT Application No. PCT/US17/35058, dated Sep. 25, 2017, 10 pages.

Patent Cooperation Treaty; "Written Opinion of the International Searching Authority" issued in PCT Application No. PCT/US17/35060, dated Aug. 4, 2017, 10 pages.

Wikipedia; "Immersive video", https://en.wikipedia.org/wiki/Immersive-video, printed on Jun. 23, 2016, 2 pages.

Wikipedia; "Omnidirectional camera", https://en.wikipedia.org/wiki/Omnidirectional_camera, printed on Jun. 23, 2016, 4 pages.

European Patent Office; "Extended European Search Report" issued in European Patent Application No. 15822840.3, dated Feb. 26, 2018, 8 pages.

Japanese Patent Office; "Notification of Reason(s) for Refusal" issued in Japanese Patent Application No. 2017-502168, dated Apr. 3, 2018, 20 pages (Includes English Translation).

Ngo Quang Minh Khiem et al.; "Adaptive Encoding of Zoomable Video Streams based on User Access Pattern;" Feb. 23, 2011, http://www.cs.princeton.edu/-qngo/docs/mmsys2011-adaptive-encoding.pdf (Year: 2011); pp. 211-222.

Patent Cooperation Treaty; "International Search Report" issued in corresponding PCT Application No. PCT/US15/36224, dated Sep. 21, 2015; 2 pages.

Patent Cooperation Treaty; "Notification of Transmittal of the International Search Report and the Written Opinion of the International Searching Authority, or the Declaration" issued in corresponding PCT Application No. PCT/US15/36224, dated Sep. 21, 2015; 2 pages.

Patent Cooperation Treaty; "Written Opinion of the International Searching Authority" issued in corresponding PCT Application No. PCT/US15/36224, dated Sep. 21, 2015; 8 pages.

renderstuff.com; "Creating Virtual 360 Panorama"; Tutorial from http://renderstuff.com/creating-virtual-360-panorama-cg-tutorial/; Printed Jun. 5, 2014; 8 pages.

USPTO; Applicant-Initiated Interview Summary in U.S. Appl. No. 14/340,152, dated Feb. 21, 2018, 3 pages.

USPTO; Final Office Action issued in U.S. Appl. No. 14/340,152, dated Aug. 23, 2016, 58 pages.

USPTO; Final Office Action issued in U.S. Appl. No. 14/340,152, dated Nov. 2, 2017, 62 pages.

USPTO; Non-Final Office Action issued in U.S. Appl. No. 14/340,152, dated Feb. 11, 2016, 33 pages.

USPTO; Non-Final Office Action issued in U.S. Appl. No. 14/340,152, dated Jun. 6, 2017, 57 pages.

USPTO; Notice of Allowance and Fee(s) Due and After Final Consideration Pilot (AFCP 2.0) Decision issued in U.S. Appl. No. 14/340,152, dated Apr. 5, 2018, 10 pages.

USPTO; Notice of Allowance and Fee(s) Due issued in U.S. Appl. No. 14/340,152, dated Aug. 6, 2018, 9 pages.

USPTO; Office Action issued in U.S. Appl. No. 15/280,947, dated May 16, 2018, 25 pages.

USPTO; Office Action issued in U.S. Appl. No. 15/280,962, dated Jun. 26, 2018, 11 pages.

Japanese Patent Office; "Decision to Grant a Patent" issued in Japanese Patent Application No. 2017-502168, dated Sep. 4, 2018, 3 pages.

Chinese Patent Office; "The First Office Action" issued in Chinese Patent Application No. 201580038371.1, dated Nov. 12, 2018, 20 pages.

USPTO; Corrected Notice of Allowability issued in U.S. Appl. No. 14/340,152, dated Jan. 8, 2019, 6 pages.

USPTO; Final Office Action issued in U.S. Appl. No. 15/280,962, dated Mar. 18, 2019, 15 pages.

Chinese Patent Office; "Notification of the Decision to Grant a Patent" issued in Chinese Patent Application No. 201580038371.1, dated Jun. 20, 2019, 5 pages.

USPTO; Notice of Allowance and Fee(s) Due issued in U.S. Appl. No. 15/280,962, dated Jul. 12, 2019, 11 pages.

USPTO; Non-Final Office Action issued in U.S. Appl. No. 15/280,947, dated Aug. 13, 2019, 26 pages.

USPTO; Notice of Allowance and Fee(s) Due issued in U.S. Appl. No. 15/280,962, dated Nov. 15, 2019, 7 pages.

USPTO; Final Office Action issued in U.S. Appl. No. 15/280,947, dated Jan. 2, 2020, 26 pages.

Japanese Patent Office; "Notification of Reason(s) for Refusal" issued in Japanese Patent Application No. 2018-568224, dated Jan. 7, 2020, 8 pages (includes English translation).

European Patent Office; "Extended European Search Report" issued in European Patent Application No. 17820807.0, dated Jan. 24, 2020, 10 pages.

European Patent Office; "Extended European Search Report" issued in European Patent Application No. 17820805.4, dated Jan. 24, 2020, 9 pages.

(56) References Cited

OTHER PUBLICATIONS

USPTO; Non-Final Office Action issued in U.S. Appl. No. 16/215,295, dated Jan. 23, 2020, 39 pages.
European Patent Office; Communication Pursuant to Rules 70(2) and 70a(2) EPC issued in European Patent Application No. 17820807.0, dated Feb. 11, 2020, 1 page.
European Patent Office; Communication Pursuant to Rules 70(2) and 70a(2) EPC issued in European Patent Application No. 17820805.4, dated Feb. 11, 2020, 1 page.
USPTO; Notice of Allowance and Fee(s) Due issued in U.S. Appl. No. 15/280,962, dated Feb. 18, 2020, 7 pages.
Japanese Patent Office; "Decision to Grant a Patent" issued in Japanese Patent Application No. 2018-568225, dated Mar. 3, 2020, 3 pages.
Korean Intellectual Property Office; "Office Action" issued in Korean Patent Application No. 10-2019-7003058, dated Mar. 10, 2020, 9 pages (includes English Translation).
USPTO; Non-Final Office Action issued in U.S. Appl. No. 15/280,947, dated May 8, 2020, 31 pages.
USPTO; Notice of Allowance and Fee(s) Due issued in U.S. Appl. No. 16/215,295, dated May 11, 2020, 5 pages.
USPTO; Notice of Allowance and Fee(s) Due issued in U.S. Appl. No. 15/280,962, dated Jun. 9, 2020, 7 pages.
USPTO; Notice of Allowance and Fee(s) Due issued in U.S. Appl. No. 16/215,295, dated Aug. 31, 2020, 5 pages.
USPTO; Corrected Notice of Allowability issued in U.S. Appl. No. 15/280,962, dated Sep. 10, 2020, 2 pages.
Chinese Patent Office; "The First Office Action" issued in Chinese Patent Application No. 201910837325.8, dated Sep. 2, 2020, 19 pages (includes English translation).
USPTO; Final Office Action issued in U.S. Appl. No. 15/280,947, dated Oct. 2, 2020, 33 pages.
Basavaraju, S. et al.; "Modified Pre and Post Processing Methods for Optimizing and Improving the quality of VP8 Video Codec"; IEEE Sponsored 2nd International Conference on Electronics and Communication Engineering Systems (ICECS 2015); https://ieeexplore.ieee.org/document/7124803?source=IQplus (Year: 2015); Feb. 26, 2015; 25 pages.
Kim, Ji-Hye et al.; "Adaptive edge-preserving smoothing and detail enhancement for video preprocessing of H .263"; 2010 Digest of Technical Papers International Conference on Consumer Electronics (ICCE); https://ieeexplore.ieee.org/abstract/document/5418723 (Year: 2010); Jan. 9, 2010; 3 pages.
Japanese Patent Office; "Notification of Reason(s) for Refusal" issued in Japanese Patent Application No. 2018-568224, dated Oct. 20, 2020, 8 pages (includes English translation).
Korean Intellectual Property Office; "Office Action" issued in Korean Patent Application No. 10-2019-7003058, dated Oct. 28, 2020, 5 pages (includes English Translation).
European Patent Office; "Communication Pursuant to Article 94(3) EPC" issued in European Patent Application No. 17820807.0, dated Nov. 23, 2020, 8 pages.
European Patent Office; "Communication Pursuant to Article 94(3) EPC" issued in European Patent Application No. 17820805.4, dated Nov. 20, 2020, 8 pages.
U.S. Appl. No. 15/280,962, filed Sep. 29, 2016, published as U.S. Pub. No. 2018/0004285 A1 on Jan. 4, 2018, now U.S. Pat. No. 10,805,592, entitled "Apparatus and Method for Gaze Tracking".
U.S. Appl. No. 14/340,152, filed Jul. 24, 2014, published as U.S. Pub. No. 2016/0012855 A1 on Jan. 14, 2016, now U.S. Pat. No. 10,204,658, entitled "System and Method for Use in Playing Back Panorama Video Content".
U.S. Appl. No. 16/215,295, filed Dec. 10, 2018, published as U.S. Pub. No. 2019/0108859 A1 on Apr. 11, 2019, entitled "System and Method for Use in Playing Back Panorama Video Content".
U.S. Appl. No. 15/280,947, filed Sep. 29, 2016, published as U.S. Pub. No. 2018/0007422 A1 on Jan. 4, 2018, entitled "Apparatus and Method for Providing and Displaying Content".
USPTO; Notice of Allowance issued in U.S. Appl. No. 16/215,295, dated Jan. 14, 2021, 5 pages.
Japanese Patent Office; "Notification of Reason(s) for Refusal" issued in Japanese Patent Application No. 2020-065716, dated Jan. 19, 2021, 23 pages (includes English translation).
USPTO; Non-Final Office Action issued in U.S. Appl. No. 15/280,947, dated Feb. 3, 2021, 34 pages.
Japanese Patent Office; "Decision to Grant a Patent" issued in Japanese Patent Application No. 2018-568224, dated Feb. 24, 2021, 3 pages.
Chinese Patent Office; "Notification of the Decision to Grant a Patent" issued in Chinese Patent Application No. 201910837325.8, dated Apr. 26, 2021, 5 pages.
USPTO; Notice of Allowance and Fee(s) Due issued in U.S. Appl. No. 16/215,295, dated May 10, 2021, 5 pages.
Korean Intellectual Property Office; "Notice of Allowance" issued in Korean Patent Application No. 10-2020-7037655, dated May 28, 2021, 3 pages.
Chinese Patent Office; "The First Office Action" issued in Chinese Patent Application No. 201780039518.8, dated May 8, 2021, 25 pages (includes English translation).

* cited by examiner

APPARATUS AND METHOD FOR CAPTURING AND DISPLAYING SEGMENTED CONTENT

CROSS-REFERENCE TO RELATED APPLICATIONS

This application claims the benefit of U.S. Provisional Patent Application No. 62/357,259, filed on Jun. 30, 2016, entitled "APPARATUS AND METHOD FOR CAPTURING AND DISPLAYING SEGMENTED CONTENT", the entire disclosure of which is hereby fully incorporated by reference herein in its entirety.

This application also claims the benefit of United States Provisional Patent Application No. 62/374,687, filed on Aug. 12, 2016, entitled "APPARATUS AND METHOD FOR PROVIDING AND DISPLAYING CONTENT", the entire disclosure of which is hereby fully incorporated by reference herein in its entirety.

This application is related to U.S. patent application Ser. No. 15/280,947, filed on the same date as this application, entitled "APPARATUS AND METHOD FOR PROVIDING AND DISPLAYING CONTENT", by inventor Dennis D. Castleman, the entire disclosure of which is hereby fully incorporated by reference herein in its entirety.

This application is also related to U.S. patent application Ser. No. 15/280,962, filed on the same date as this application, entitled "APPARATUS AND METHOD FOR GAZE TRACKING", by inventor Dennis D. Castleman, the entire disclosure of which is hereby fully incorporated by reference herein in its entirety.

BACKGROUND OF THE INVENTION

1. Field of the Invention

The present invention relates generally to image capture and display.

2. Discussion of the Related Art

An omnidirectional or 360-degree camera is a camera with a 360-degree field of view in the horizontal plane or with a visual field that covers approximately the entire sphere around a focal point. Immersive videos, sometimes also referred to as 360 videos, 360-degree videos, or spherical videos, are video recordings of a real-world panorama, wherein the view in every direction is recorded at approximately the same time. An Immersive video may be shot using an omnidirectional camera and/or a collection of cameras. An immersive video may be presented with the viewer having control of the viewing direction to provide a form of virtual reality.

SUMMARY OF THE INVENTION

One embodiment provides a method for providing content comprising: determining a viewing direction of a user viewing a content item comprising a plurality of video streams, selecting two or more video streams of the content item based on the viewing direction of the user and directional data associated with the plurality of video streams, decoding the two or more video streams to form two or more decoded video streams, stitching the two or more decoded video streams to form a combined image, and causing the combined image to be displayed to the user.

Another embodiment provides a system for providing content comprising: a video decoder, a graphic processor, and a central processor configured to: determine a viewing direction of a user viewing a content item comprising a plurality of video streams, selectively retrieve two or more video streams of the content item based on the viewing direction of the user and directional data associated with the plurality of video streams, causing the video decoder to decode the two or more video streams, cause the graphic processor to stitch the two or more decoded video streams to form a combined image, and causing the combined image to be displayed to the user.

Another embodiment provides a non-transitory computer readable storage medium storing one or more computer programs configured to cause a processor based system to execute steps comprising: determining a viewing direction of a user viewing a content item comprising a plurality of video streams, selecting two or more video streams of the content item based on the viewing direction of the user and directional data associated with the plurality of video streams, decoding the two or more video streams to form two or more decoded video streams, stitching the two or more decoded video streams to form a combined image, and causing the combined image to be displayed to the user.

Another embodiment provides an apparatus for capturing content comprising: a plurality of cameras forming a multi-directional camera assembly, at least one inertial measurement unit coupled to the multi-directional camera assembly, a video encoder, a memory device, and a processor configured to: cause the plurality of cameras to capture a plurality of video streams, record directional data for the plurality of video streams based on the at least one inertial measurement unit, cause the video encoder to separately encode each of the plurality of video streams, and store, in the memory device, a plurality of encoded video streams and the directional data for playback by a playback device.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein.

DETAILED DESCRIPTION

Image stitching is the process of combining multiple photographic images with overlapping fields of view to produce a combined image such as a segmented panorama, a high-resolution image, a surround view content, and/or an immersive video content. With an omnidirectional or a surround view camera system, multiple image sensors may be pointed in different directions to capture images at the same time and the images may be stitched to produce an immersive video and/or a surround view content. In some embodiments, the content recorded by these types of camera systems may be viewed by a head mounted display such as the systems and devices described in U.S. patent application Ser. No. 15/085,887, filed on Mar. 30, 2016, entitled "Head-Mounted Display Tracking," the entire disclosure of which is hereby fully incorporated by reference herein in its entirety.

Figure 1:
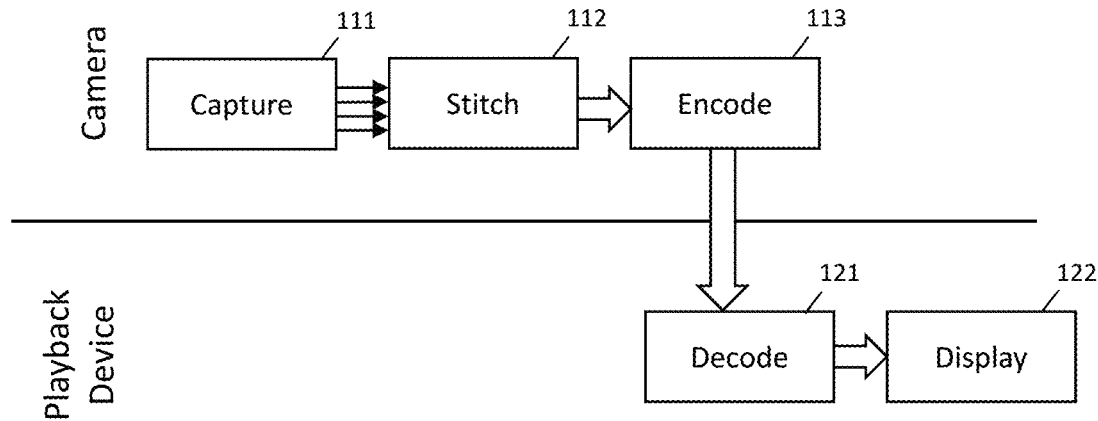
FIG. 1 is a process diagram illustrating a prior art process for providing content.

Referring first to FIG. 1, a conventional process of recording and displaying stitched content is shown. In a conventional multi-camera system, the image sensors may each capture a video stream in step 111 and the video streams captured by each image sensor (represented four arrows between steps 111 and 112) are stitched to form a combined video in step 112. The combined video (represented by a single wide arrow) are then encoded in step 113 for storage and/or transfer. The encoded video file comprising the combined video is then provided to a playback device directly or through a server (not shown). The playback device configured to display the stitched content would first decode the video file containing the stitched video in step 121 and display the decoded video on a display device in step 122.

As shown in FIG. 1, conventionally, the video streams captured by different image sensors of a camera system are stitched at the camera system, and the stitched video, including data from all video streams, are loaded and decoded at the playback device.

Figure 2:
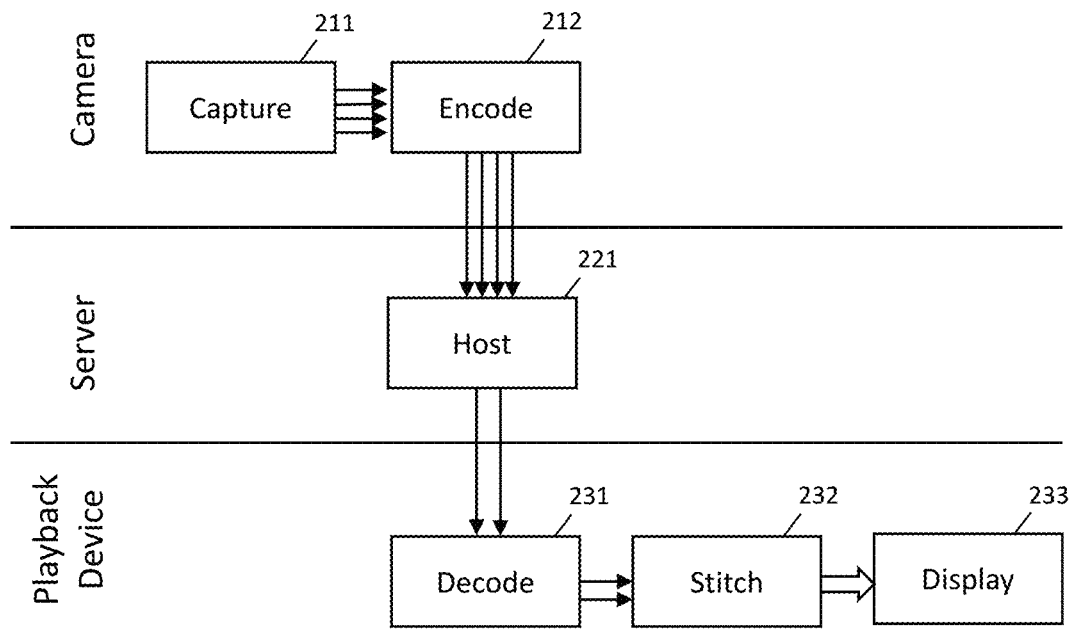
FIG. 2 is a process diagram illustrating a process for providing content in accordance with some embodiments of the present invention.

Referring next to FIG. 2, a process for recording and displaying segmented content according to some embodiments is shown. In step 211, video streams are captured by a plurality of image sensors of the camera system. The image sensors may comprise the sensors on one or more of a panoramic camera system, a surround view camera system, a 360-degree camera system, and an omnidirectional camera system, and the like. In step 212, the video streams from each camera sensor (represented by arrows between steps 211 and 212) are individually encoded and uploaded to a server. In some embodiments, directional data associated with the captured content is also recorded in 211 and uploaded to the server. In step 221, the server hosts the individually encoded video streams for streaming and/or on-demand download by a playback device. In some embodiments, the playback device may determine which of the video streams corresponds to a viewer's current and/or predicted viewing direction and only retrieve those video streams. In the example shown in FIG. 2, only two out of the four streams are retrieved by the playback device from the server. In step 231, the playback device decodes the retrieved video streams. In step 232, the decoded streams are stitched to form a combined view. The stitched content (represented by the wide arrow) is then displayed to a viewer in step 233.

In some embodiments, alternatively, all video streams of the content item may be retrieved/downloaded from the server to the playback device and the playback device may only select one or more video streams to decode in step 231 and/or stitch in step 232 based on the viewing direction of the viewer.

Thus, in the process shown in FIG. 2 the stitching is performed after compression/encoding, whereas in the process shown in FIG. 1 the stitching is performed before compression/encoding. With the process shown in FIG. 2, the cost and latency for providing videos captured at the camera for playback at the playback device may be reduced in several ways. First, the download bandwidth demand at the playback device may be decreased by reducing the file size required to be downloaded/cached to display the content to the user. Second, selectively decoding and stitching of video streams may reduce the processing time at the playback device. Additionally, performing the stitching at the playback device also allows for device specific warp and distortion adjustments to be made along with image stitching. The hardware costs and demand on computing resources at the camera may also be decreased by shifting the stitching process to the playback device.

In some embodiments, the systems and methods described herein may use the commodity of the camera controller and the memory controller to lower Bill of Material (BOM) cost at the capture device. The system also allows the resolution of the captured content to scale depending on the number of cameras in the capture device. In some embodiments, a mobile, computer, and/or cloud-based application may be provided to transcode the multi-stream video file described herein to common formats such as those used for sharing on social media (e.g. YouTube and Facebook). In some embodiments, Inertial Measurement Unit (IMU) data recorded by the capture device can further be utilized to determine video stream(s) to decode at the playback device.

Figures 3, 4:
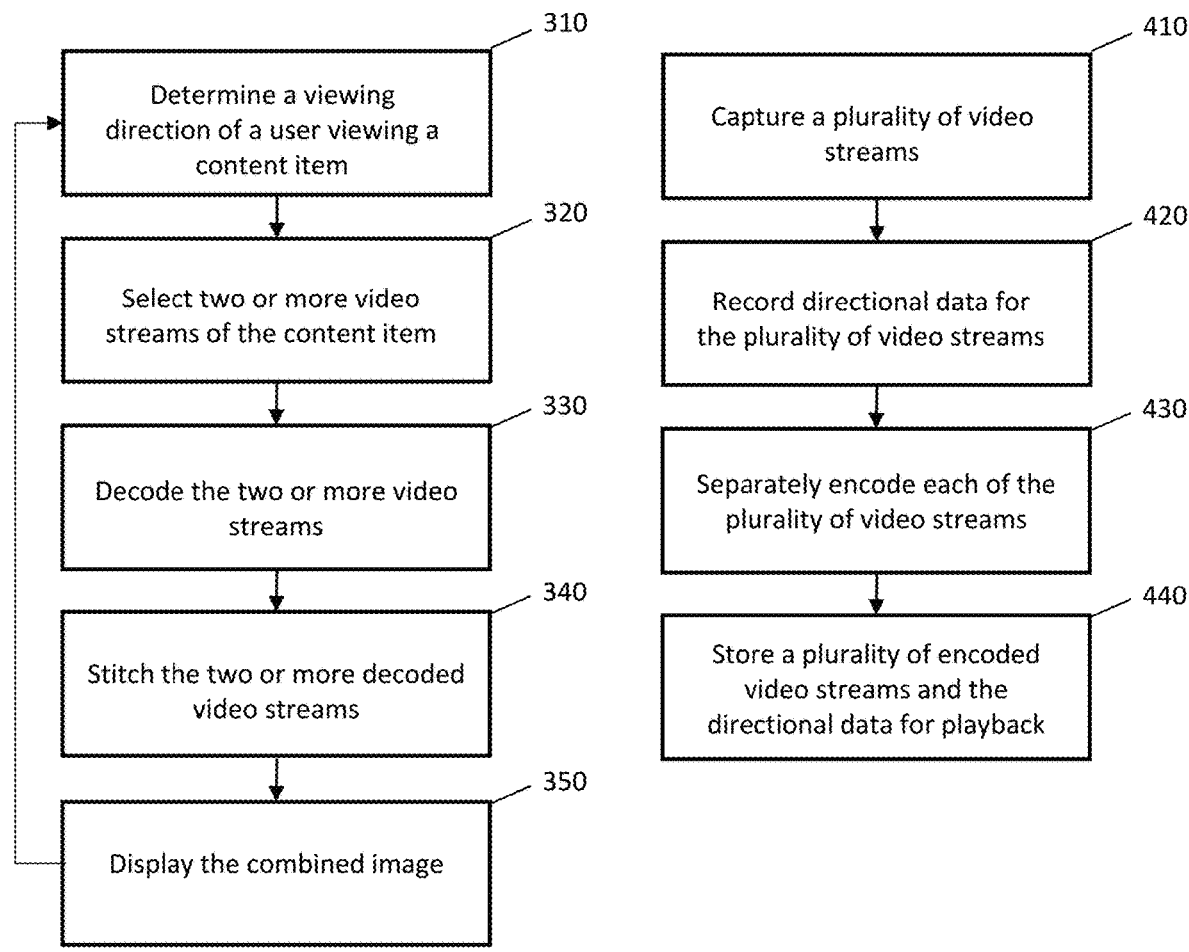
FIG. 3 is a flow diagram illustrating a method for providing content in accordance with some embodiments of the present invention.
FIG. 4 is a flow diagram illustrating a method for recording content in accordance with some embodiments of the present invention.

Referring next to FIG. 3, a method for providing content is shown. The steps in FIG. 3 may generally be performed by a processor-based device such as a one or more of a head mounted display ("HMD"), an augmented reality device, a virtual reality device, a wearable device, a portable user device, a smartphone, a personal computer, a server device, a television, a tablet computer, a game console, etc. In some embodiments, the steps in FIG. 3 may be performed by one or more of the content server 620, the playback device 630, and the display device 640 described with reference to FIG. 6 and the playback device 820 and the display device 830 described with reference to FIG. 8 herein or other similar devices.

In step 310, the system determines a viewing direction of a user viewing a content item. In some embodiments, the viewing direction of the user may comprise one or more of a head direction and a gaze direction. In some embodiments, the head direction of the user may be determined by a head tracker device comprising one or more of an Inertial Measurement Unit (IMU), an accelerometer, gyroscope, an image sensor, and a range sensor. In some embodiments, an IMU may comprise an electronic device that measures and reports a body's specific force, angular rate, and/or magnetic field surrounding the body, using a combination of accelerometers and gyroscopes, sometimes also magnetometers. In some embodiments, the head tracker device may be coupled to a head mounted display (HMD) worn by the user. In some embodiments, the gaze location of the user may be determined by a gaze tracker device comprising one or more of an image sensor, an optical reflector sensor, a range sensor, an electromyography (EMG) sensor, and an optical flow sensor. In some embodiments, the viewing direction may be based on a user's input via one or more input devices. For example, a user may use a joystick, a touchpad, a mouse, direction key, and the like to change the viewing direction. In some embodiments, the viewing direction may correspond to a point of focus in a 3D space. In some embodiments, the viewing direction may comprise a 3D angle such as a direction represented by a spherical azimuthal angle ($\theta$) and polar angle ($\varphi$). In some embodiments, the viewing direction may comprise a 2D polar angle ($\varphi$). In some embodiments, the directional data may comprise the pitch, yaw, and roll of the viewer's head, eyes, and/or the display device.

The content item may comprise a plurality of video streams captured by one or more of a panoramic camera system, a surround view camera system, a 360-degree camera system, an omnidirectional camera system, and the like. In some embodiments, the content item may be recorded with systems and methods described with reference to FIGS. 2, 4, 6, and 7 herein. In some embodiments, the content item may comprise a segmented content corresponding one or more of a panorama video, an immersive video, and/or an omnidirectional video. In some embodiments, each of the plurality of video streams may be captured by a separate image sensor of a camera assembly. In some embodiments, the content item may comprise pre-recorded or real-time streaming content. The content item may comprise a plurality of individually encoded video streams hosted on a server accessible to a playback device.

In some embodiments, after step 310, the system may determine whether one or more video streams of the content item falls within the view area of the user viewing the content item. In some embodiments, the user's view area may correspond to an area around a fixation point corresponding to the viewing direction. The view area may be estimated based on view direction and/or gaze tracking. In some embodiments, the view area may correspond to an assumed field of view based on general population data and/or may be calibrated for the specific user. In some embodiments, the viewing direction may be based on a user's input via one or more input devices. For example, a user may use a joystick, a touchpad, a mouse, direction key, and the like to change the viewing direction. The view area may then correspond to the display area associated with the viewing direction. In some embodiments, if only one video stream falls within the view area, the system may only retrieve and/or decode the select video stream to display to the user. In some embodiments, the system may perform steps 320-340 only if two or more video streams fall within the view area of the user.

In step 320, the system selects two or more video streams of the content item. The selection of the video streams may be based on the viewing direction of the user determined in step 310 and directional data associated with the plurality of video streams of the content item. In some embodiments, the system may be configured to predict a future viewing direction based on the detected viewing direction history of the user, and the viewing direction used in step 310 may comprise a predicted future viewing direction. The directional data of the plurality of video streams may be recorded by the capture system that records the content item and included as part of the content item file. In some embodiments, the capture system may include one or more IMUs for recording the orientation of the captured system during the recording of the content item. The IMU data associated with the current section of the content item may be compared with the viewing direction of the user to determine the video streams that corresponds to the viewing direction of the user.

In some embodiments, selecting the two or more video streams comprises loading the selected video streams to a buffer or cache to decode. In some embodiments, selecting the two or more video streams comprises retrieving the selected streams from a server that hosts the content item.

In step 330, the system decodes the two more video streams selected in step 320 to form two or more decoded video streams. In some embodiments, the decoding may be performed by an image or video decoder hardware and/or software module on the playback device. In some embodiments, the video streams may be decoded according to on the encoding scheme associated with the file format of the video streams. In some embodiments, the video streams may be encoded in a format that allows for partial video decoding (e.g. MPEG-2, MPEG-4). In some embodiments, the system may only retrieve and decode the temporal portion of the video stream that corresponds to the temporal portion of the content item to be displayed to the user. In some embodiments, the system may decode the two or more video streams by selectively decoding portions of the two or more video streams that fall within the view area of the user based on the viewing direction of the user.

In step 340, the system stitches the two or more decoded video streams to form a combined image. In some embodiments, the video streams may be stitched according to known stitching methods such as methods comprising one or more of aligning, warping, and blending of the video streams. In some embodiments, the aligning of the images may be performed at the playback device via feature and/or keypoint detection. In some embodiments, the capture device and/or a server may provide alignment and/or warp parameters associated with the capture device along with the content item. For example, a set of alignment and/or warp parameters may be calibrated and stored by the capture device and/or another system based on previous images captured by the capture system and/or another capture system of the same model/setup. Assuming that the positions of image sensors of the capture system remain fixed relative to each other, the alignment and/or warp parameters may be used to process subsequent captures at the playback device without separately performing feature or keypoint detection for alignment and/or warping at the playback device.

In some embodiments, the system may further be configured to selectively stitch portions of the video streams based on the view area of the user. For example, if only a portion of the overlapping area of the two video streams falls within the view area of the user, the system may only blend the portion of the overlaying area that is estimated to be visible to the user. In some embodiments, the degree of blending may further depend on the area's position in the field of view. For example, a rough (e.g. less computationally demanding) blending may be performed if the overlapping area falls in the peripheral area of the user's field of view and a more extensive blending may be performed if the overlapping area falls near the fixation point of the user. In some embodiments, the stitching of the two or more decoded video streams further comprises combining images based on warp and distortions associated with a playback device.

In step 350, the system causes the combined image generated in step 340 to be displayed to the user. In some embodiments, the image may be displayed on a flat screen display device or a head mounted display. In some embodiments, prior to step 350, the system further adjusts the combined image based on the parameters associated with the display device. In some embodiments, the system may generate stereoscope images for a 3D and/or virtual reality display device. In some embodiments, the system may adjust the resolution of the combined image based on the display resolution of the display device. In some embodiments, the system may adjust the images based on warp and distortion associated with the display device.

In some embodiments, steps 310-350 may be continuously repeated as the user changes his/her viewing direction while viewing the content item. Depending on the viewing direction detected in step 310, the video streams selected, decoded, and stitched in steps 320-340 may change over time.

In some embodiments, the video streams selected in step 320 may be pre-processed and at least partially stitched. For example, the capture device may capture a single video stream or the capture device and/or a content server may first stitch the video streams to form a combined image. The content server may then segment the video into multiple video streams that are already warped, aligned, and/or blended with each other and separately encode each processed video stream. The playback device may then selectively retrieve the processed video streams from the server according to steps 310-330 and stitch the video streams by simply combining the video streams side-by-side without performing further aligning and blending at the playback device.

Referring next to FIG. 4, a method for recording content is shown. The steps in FIG. 4 may generally be performed by a processor-based device such as a one or more of an omnidirectional camera system, a 360-degree camera system, a panorama camera system, a head mounted display ("HMD"), a wearable device, a portable user device, a smartphone, a personal computer, etc. In some embodiments, the steps in FIG. 4 may be performed by one or more of capture device 610 and the content server 620 described with reference to FIG. 6 herein, the video capture system described with reference to FIG. 7 herein, or other similar devices.

In step 410, the system captures a plurality of video streams. In some embodiments, the video streams are each captured by an image sensor in a multi-camera system such as one or more of a panoramic camera system, a surround view camera system, a 360-degree camera system, and an omnidirectional camera system, and the like. The image sensor may each point in a different direction to capture different views around the capture device at the same time.

In step 420, the system records directional data for the plurality of video streams. In some embodiments, the camera system may comprise an IMU that senses directional data of the capture system. In some embodiments, each camera device of the camera system may include an IMU for recording its directional data. In some embodiments, the directional data may comprise pitch, yaw, and roll of the camera system. In some embodiments, the viewing direction may comprise a 3D angle such as a direction represented by a spherical azimuthal angle ($\theta$) and polar angle ($\varphi$). In some embodiments, the viewing direction may be represented by a 2D polar angle ($\varphi$). In some embodiments, the directional data may be recorded over time and timestamped along with the video streams. For example, directional data may comprise a plurality of data points each corresponding to one or more frames of the recorded content.

In step 430, the plurality of video streams captured in step 410 are separately encoded. In some embodiments, the directional data recorded in step 420 may be encoded with each video stream. The encoding may be performed by a video encoder based on any known encoding scheme such as MPEG-2, MPEG-4, MPEG-H, WMV, and the like. In some embodiments, the video streams may be encoded as the content item is being recorded for streaming to a playback device. In some embodiments, the video streams may be encoded at the completion of the recording of the content item.

In step 440, the system stores the encoded video streams and the directional data. In some embodiments, the encoded video streams and directional data may be stored in one or more of a volatile memory device (e.g. Random Access Memory, buffer memory, cache memory, etc.) and/or a non-volatile memory device (e.g. hard drive, solid state drive, memory card, etc.). In some embodiments, the encoded video streams and the directional data may be stored in a specialized container file format. In some embodiments, the system may be configured to upload the plurality of encoded video streams and the directional data to a server accessible by the playback device. The system may then make the content item available for playback at a playback device in substantially real-time and/or on-demand. In some embodiments, the video streams may be stored in a portable memory device (e.g. hard drive, memory card) and may be directly retrieved by a playback device for playback. In some embodiments, the playback device may process the video streams and the directional data for display according to methods describes with reference to FIGS. 2, 3, and 8 herein.

Figure 5A:
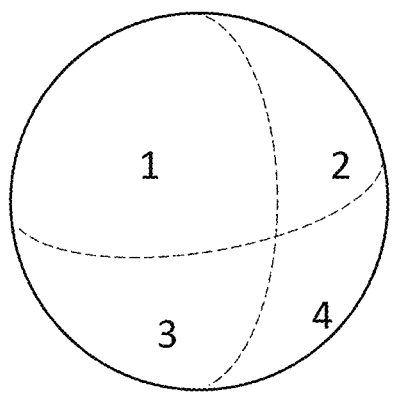
FIGS. 5A and 5B are illustrations of selective video stitching in accordance with some embodiments of the present invention.
Figure 5B:
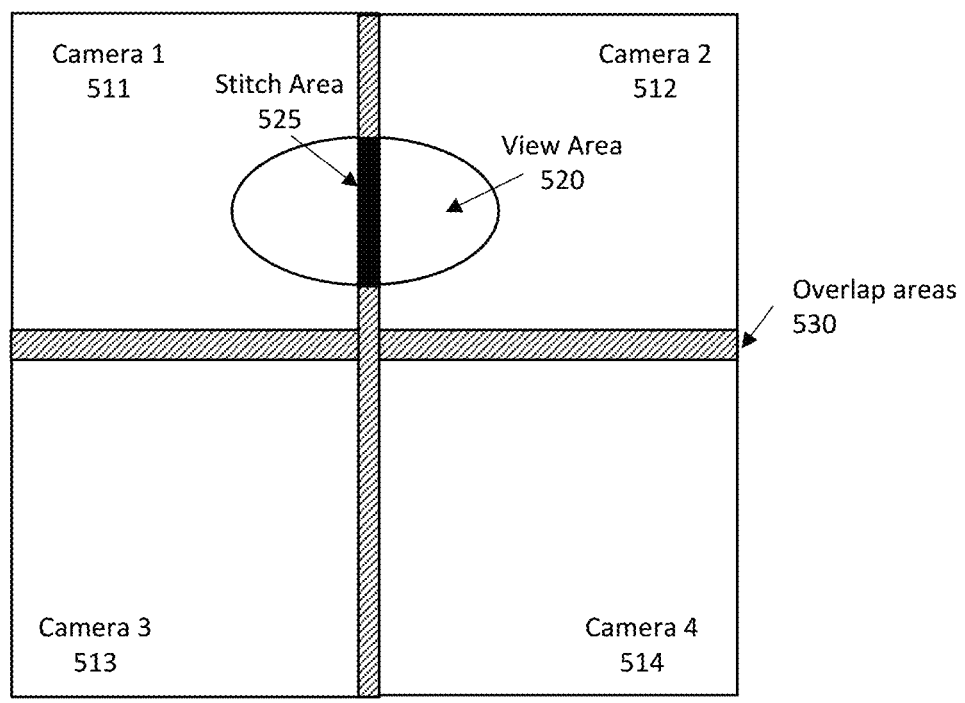

Next referring to FIGS. 5A and 5B, an illustration of selective video stitching is shown. FIG. 5A illustrates a sample segmentation of an omnidirectional video content captured by four cameras. The sphere in FIG. 5A represents all viewing angles around an omnidirectional camera. Numbers 1-4 represent the segments of the sphere configured to be captured by each of the four camera devices in an omnidirectional capture system. FIG. 5A is shown as an example only. A capture system may comprise any number of camera devices and/or capture only a portion of a 360-degree surround view without departing from the spirit of the present disclosure.

FIG. 5A illustrates selective video stitching of a content item comprising four video streams. In some embodiments, video streams 511, 512, 513, and 514 in FIG. 5B may correspond to the segments 1-4 as shown in FIG. 5A. The video streams 511, 512, 513, and 514 are each captured by cameras 1-4 respectively and may be separately encoded for transmission. The video streams 511-514 overlaps one or more of its adjacent video streams in overlap areas 530 (represented by dashed and solid fill). The overlap areas 530 are shown as an example only and may differ in size and shape depending on the capture device. Furthermore, the alignment of the video streams 511-514 may also differ depending on the capture device. For example, the overlap areas 530 between video streams 511 and 512 and between video streams 513 and 514 may be offset and/or be of different width or height.

To perform selective stitching, the system may first determine the view area 520 of a user viewing the content. The view area 520 may be determined based on one or more of head tracking, gaze tracking, and user input. An example location of the view area 520 is shown in FIG. 5B. The view area 520 may be located relative to the video streams 511-512 based on comparing directional data of the capture device and the directional data associated with the display device and/or viewer. The shape of the view area 520 is shown as an example only. In some embodiments, the shape of the view area may correspond to shape of the typical field of view of human perception.

Once the view area 520 is determined, the system may then determine which of the video streams correspond to the view area 520. In the example shown in FIG. 5B, only video streams 511 and 512 overlaps within the view area 520. The system may then download and/or decode only video streams 511 and 512 and not video streams 513 and 514. The system may then also only stitch the overlap area 530 between video streams 511 and 512. In some embodiments, the system may stitch the entire overlap area 530 between the video streams 511 and 512. In some embodiments, the system may only stitch the overlap area 530 that also falls within the view area 520. That is, the overlap area 530 that falls outside of the view area 520 is not stitched. For example, the system may only stitch the stitch area 525 (represented by solid fill) in FIG. 5B. In some embodiments, the system may further determine a blending strength based on a determining a fixation point of a user's gaze. For example, if the stitch area 525 or a section of the stitch area 525 falls near a fixation point of the user's gaze, a high power blending may be applied to the area. If the stitch area 525 or a section of the stitch area 525 falls at the peripheral region of the view area 520, the system may selectively perform a lower power blending of the two video images to reduce computing resource demands and processing latency.

In some embodiments, as the view area 520 of the viewer moves around relative to the video streams over time, the system may selectively retrieve and decode one or more of the video streams 511-514 and selectively stitch sections of the overlap areas 530 to generate and present the content to the user. In some embodiments, the system may predict the view area 520 and/or a viewing direction of the viewer to selectively retrieve and blend the video streams 511-512 to create a buffer. Generally, with the selectively video stream decoding and stitching, the computing resource demands may be reduced at the capturing device and at the playback device. In case of streaming content, the network bandwidth consumption for playback may also be reduced.

In some embodiments, the selective video stream selection and/or stitching may be performed based on detecting a viewing direction alone without determining the boundaries of the view area 520. For example, the system may estimate that a user's viewing direction corresponds to video streams 513 and 514 based on the directional data of the capture device and retrieve and stitch the video streams 513 and 514.

Figure 6:
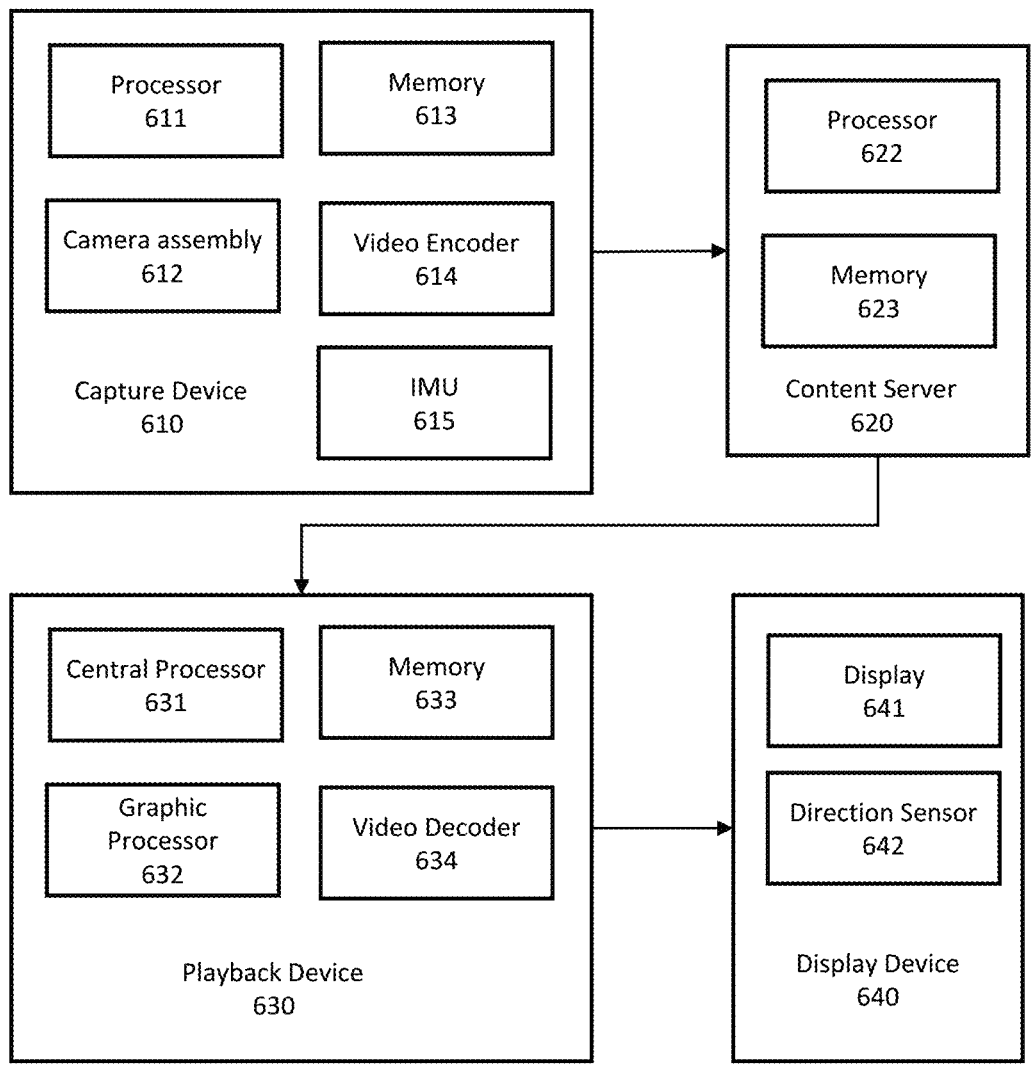
FIG. 6 is a block diagram illustrating a system in accordance with some embodiments of the present invention.

Referring next to FIG. 6, there is shown a system for recording and displaying content that may be used to run, implement and/or execute any of the methods and techniques shown and described herein in accordance with some embodiments of the present invention. The system includes a capture device 610, a content server 620, a playback device 630, and a display device 640. Each of the capture device 610, the content server 620, the playback device 630, and the display device 640 may be configured to communicate with each other via one or more of wired or wireless data connection and/or via a network such as a the Internet.

The capture device 610 includes a processor 611, a camera assembly 612, a memory 613, a video encoder 614, and an IMU 615. In some embodiments, the capture device 610 may comprise a multi-camera video capture system such as an omnidirectional camera system and a surround view camera system. In some embodiments, the processor 611, the camera assembly 612, the memory 613, the video encoder 614, and the IMU 615 may be enclosed in a portable housing of the capture device 610.

The processor 611 may comprise a control circuit, a central processor unit, a microprocessor, and the like. The memory 613 may include one or more of a volatile and/or non-volatile computer readable memory devices. In some embodiments, the memory 613 stores computer executable code that causes the processor 611 to capture and encode video streams captured by the camera assembly 612 along with the directional data measured by the IMU 615. The memory 613 may store content captured by the camera assembly 612 and directional data from the IMU 615. In some embodiments, captured content and IMU data may be stored on a removable memory device such as a memory card or a removable hard drive. In some embodiments, the memory 613 further stores computer executable code that causes the processor 611 to stream and/or upload the recorded content to the content server 620 in real time and/or as initiated by a user. In some embodiments, computer executable code causes the processor 611 to perform one or more steps described with reference to FIGS. 4 and 7 herein. In some embodiments, the memory 613 may be at least partially implemented by one or more of a local, a removable, a remote, and a cloud-based computer readable memory storage.

The camera assembly 612 generally comprise two or more camera devices configured to capture views around the capture device 610. In some embodiments, the camera devices of the camera assembly 612 may comprise one or more convex and/or concaved mirrors. The camera devices may generally comprise any conventional image sensors such as CCD and CMOS sensors.

The video encoder 614 may comprise a hardware and/or software module configured to encode video streams captured by the camera assembly 612 according to one or more encoding schemes (e.g. MPEG, WMV, etc.). In some embodiments, the video encoder 614 may be implemented by the processor 611, the memory 613, and/or a discrete graphics processor (not shown). In some embodiments, different video encoders may be assigned to encode video streams captured by each of the camera devices of the camera assembly 612.

The IMU 615 may generally comprise an electronic device that measures and reports a body's specific force, angular rate, and sometimes the magnetic field surrounding the body, using a combination of accelerometers and gyroscopes, sometimes also magnetometers. In some embodiments, the IMU 615 may be configured to measure the pitch, yaw, and/or roll of the entire capture device 610. In some embodiments, each image sensor of the camera assembly 612 may be coupled to an IMU 615 for recording the pitch, yaw, and/or roll of associated image sensor.

In some embodiments, the capture device 610 may further include a communication device such as a network adapter, a Wi-Fi transceiver, a mobile data network transceiver, etc. for uploading and/or streaming the recorded content to the content server 620 and/or the playback device 630. In some embodiments, the capture device 610 may be communicatively coupled to a network enabled user device such as a smartphone, a tablet computer, a laptop computer, a desktop computer, etc. and communicate with the content server 620 and/or the playback device 630 via the user device. In some embodiments, the capture device 610 may further include one or more user input/output devices such as buttons, a display screen, a touch screen, and the like for the user to control the capturing and/or transmitting of content. In some embodiments, the capture device 610 may not be configured to process the captured images aside from encoding the images for transfer.

While the capture device 610 in FIG. 6 includes one set of camera assembly 612, processor 611, memory 613, video encoder 614, and IMU 615, in some embodiments, the camera devices in the camera assembly 612 may each include or share one or more of a processor 611, a memory 613, a video encoder 614, and a IMU 615. For example, the capture device 610 may comprise a plurality of standalone camera devices that encodes and sends the recorded video streams to a central processor and/or a server that associates the recorded video streams with a content item.

The content server includes a processor 622 and a memory 623. The content server may generally comprise one or more processor-based devices accessible by the playback device via a network such as the Internet. In some embodiments, the content server may comprise one or more of a media server, a streaming video server, a broadcast content server, a social networking server, and the like. The processor 622 may comprise a control circuit, a central processor unit, a microprocessor, and the like. The memory 623 may include one or more of a volatile and/or non-volatile computer readable memory devices. In some embodiments, the memory 623 stores computer executable code that causes the processor 622 to receive content recorded by the capture device 610 and provide the content to the playback device 630. In some embodiments, the processor 622 may be configured to selectively provide one or more video streams of a content item to the playback device 630 based on a request from the playback device 630. In some embodiments, the request may comprise an identification of the requested video streams and/or directional data of the viewer.

In some embodiments, the content server 620 may be configured to select the video stream(s) to provide to the playback device 630 based on the directional data of the content item and the directional data of the viewer received from the playback device 630 and/or the display device 640. The memory 623 and/or a separate content library may store one or more content items each comprising a plurality of video streams. In some embodiments, the content server 620 may be configured to stream the content recorded by the capture device 610 to the playback device 630 in substantially real-time. In some embodiments, the content server 620 may be configured to host a plurality of previously recorded content items for streaming or downloading to the playback devices 630 on-demand. While only one capture device 610 and one playback device 630 is shown in FIG. 6, in some embodiments, the content server 620 may be configured to simultaneously receive content from a plurality of capture devices 610 and/or provide content to a plurality of playback devices 630. In some embodiments, the content server 620 may be configured to facility peer-to-peer transfer of video streams between capture devices 610 and playback devices 630.

In some embodiments, the content server 620 may further be configured to pre-process the content item before providing the content item to the playback device 630. In some embodiments, the content server 620 may be configured to stitch the video streams received from the capture device 610 by warping, aligning, and/or blending the video streams according. The content server 620 may then segment the stitched video into multiple video streams that are already aligned and blended with each other and separately encode each processed video stream. When the pre-processed video streams are provided to a playback device 630, the playback device 630 may stitch the video streams by simply combining the video streams side-by-side without performing further aligning and blending.

The playback device 630 includes a central processor 631, a graphic processor 632, a memory 633, and a video decoder 634. In some embodiments, the playback device 630 may generally comprise a processor-based devices such as one or more of a game console, a personal computer, a tablet computer, a television, a head mounted display ("HMD"), an augmented reality device, a virtual reality device, a wearable device, a portable user device, a smartphone, etc. The central processor 631 may comprise a control circuit, a central processor unit (CPU), a microprocessor, and the like. The memory 633 may include one or more of a volatile and/or non-volatile computer readable memory devices. In some embodiments, the memory 633 stores computer executable code that causes the central processor 631 determine a viewing direction of a user, retrieve video streams associated with a content item from the content server 620 and/or from a local storage, and stitch the video streams to generate a combined image to display to the user at the display device 640. In some embodiments, the memory 633 may comprise a buffer for buffering the content item retrieved from the content server 620. In some embodiments, the memory 633 may be configured to store at least a portion of the content item downloaded or streamed from the content server 620.

The graphic processor 632 may comprise a control circuit, a graphic processing unit (GPU), a microprocessor, and the like. In some embodiments, the graphic processor 632 may comprise a discrete graphic processor separate from the central processor 631. In some embodiments, the graphic processor 632 may comprise its own RAM for processing images. The graphic processor 632 may generally be configured to warp and stitch received video streams to generate images for display on the display device 640. In some embodiments, the graphic processor 632 may further be configured to generate stereoscope images for display on the display device 640 with stereoscopic display capabilities.

The video decoder 634 may comprise a hardware and/or software module configured to decode video streams received from the content server 620 and/or the capture device 610 according to one or more encoding schemes (e.g. MPEG, WMV, etc.). In some embodiments, the video decoder 634 may be implemented with one or more of the central processor 631, the graphic processor 632, and the memory 633.

In some embodiments, the playback device 630 may further include a communication device such as a network adapter, a Wi-Fi transceiver, a mobile data network transceiver, etc. for requesting and downloading content items from the content server 620 and/or the capture device 610. In some embodiments, the playback device 630 may further include one or more user input/output devices such as buttons, a controller, a keyboard, a display screen, a touch screen and the like for the user to control the selection and playback of content items.

The display device 640 includes a display 641 and a direction sensor 642. In some embodiments, the display device 640 may comprise one or more of a monitor, a head mounted display (HMD), a virtual reality display device, a wearable device, a display screen, a mobile device, and the like. The display 641 may generally comprise any conventional display screen configured to display a content to the user. In some embodiments, the display may comprise a stereoscopic display having one or more screens.

The direction sensor 642 may comprise a sensor configured to determine a viewing direction of a viewer of the display 641. In some embodiments, the direction sensor 642 may comprise an IMU similar to the IMU 615 described herein. In some embodiments, the direction sensor 642 may be coupled to an HMD and/or a wearable device that allows the sensor to detect the motion of the user's head or eyes via the motion of the HMD and/or wearable device. In some embodiments, the direction sensor 642 may comprise an optical sensor for detecting one or more of a head motion and eye-motion of the user. The optical sensor may be coupled to an HMD and/or a wearable device or may be a stationary device that captures images of the user from a distance. In some embodiments, the direction sensor 642 may comprise a user input device such as a joystick, a touchpad, a mouse, direction key, and the like. The user may use the user input device(s) to manually manipulate viewing direction. For example, the user may click and/or drag the display area to change the viewing direction.

In some embodiments, the display device 640 may be coupled to the playback device 630 via a wired or wireless communication channel. In some embodiments, the display device 640 may be integrated with the playback device 630. In some embodiments, the display device 640 may further comprise a processor and/or a memory for at least partially storing the displayed content and/or the viewer's directional data detected by the direction sensor 642.

Figure 7:
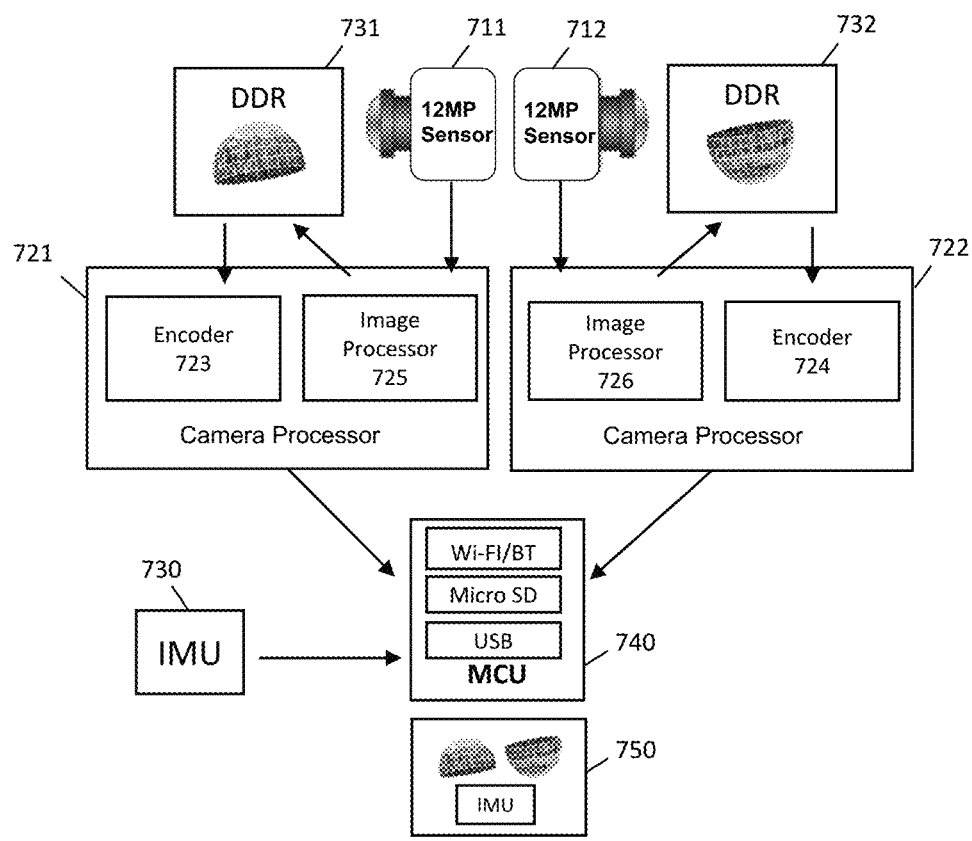
FIG. 7 is a block diagram illustrating a video capture system in accordance with some embodiments of the present invention.

Next referring to FIG. 7, a block diagram illustrating an example of a video capture system is shown. The system shown in FIG. 7 includes two sets of image sensors and camera processors. In the first set, an image sensor 711 (e.g. 12 Megapixel sensor) captures an image corresponding to the top hemisphere portion of the view around the capture device. The sensor data is processed by the image processor 725 of the camera processor 721 and stored in a RAM 731 (e.g. DDR RAM). The image data is then encoded by the encoder 723 of the camera processor 721 to generate a first encoded video stream. In the second set, an image sensor 712 captures an image corresponding to the bottom hemisphere portion of the view around the capture device. The sensor data is processed by the image processor 726 of the camera processor 722 and stored in a RAM 732 (e.g. DDR RAM). The image data is then encoded by the encoder 724 of the camera processor 722 to generate a second encoded video stream.

During the recording of the first and second video streams, the directional data of the capture device may also be recorded by an IMU 730 on the capture device. The content item file 750 comprising the separately encoded first and second video streams and the IMU directional data is then generated via the Memory Controller Unit (MCU) 740 of the capture device. In some embodiments, the video streams may be encoded in a standardized format (e.g. MPEG-2, MPEG-4) and content item file 750 may comprise a specialized container file format configured to contain multiple video streams and directional data. The content item file 750 may be transmitted via a Wi-Fi or Bluetooth transceiver, stored into a memory card (e.g. Micro SD), and/or transferred via a Universal Serial Bus (USB) port via the MCU 740. While FIG. 7 shows two RAMs 731 and 732 and two camera processors 721 and 722, in some embodiments, two or more image sensors may share the same RAM and/or camera processor.

Figure 8:
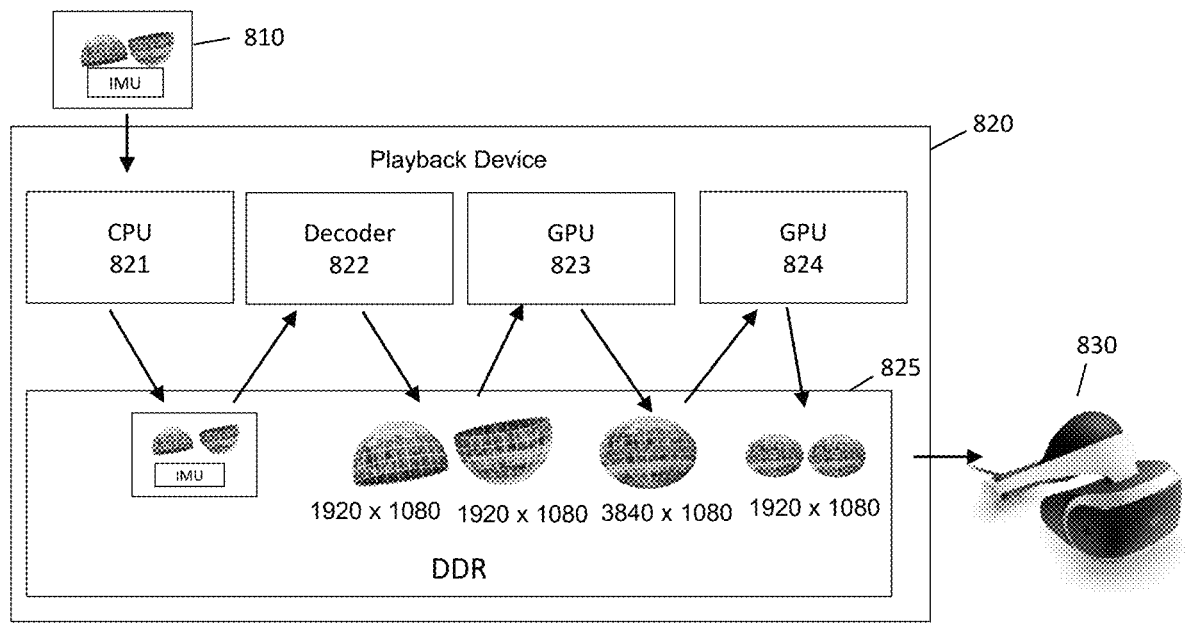
FIG. 8 is a block diagram illustrating a playback system in accordance with some embodiments of the present invention.

Next referring to FIG. 8, a block diagram illustrating a video playback system is shown. The playback device 820 may generally comprise a processor-based device such as one or more of a game console, a personal computer, a tablet computer, a television, a head mounted display ("HMD"), an augmented reality device, a virtual reality device, a wearable device, a portable user device, a smartphone, etc. In FIG. 8, the playback device 820 receives a content item file 810 for playback. In some embodiments, the content item 810 may comprise a file generated by a capture system described with reference to FIG. 7 herein, such as the content item file 750. In some embodiments, the content item 810 may comprise downloaded or streaming video content.

The content item file 810 may first be processed by the CPU 821 of the playback device and stored in the RAM 825 (e.g. DDR RAM). The video streams in the content item file may 810 then be decoded by a decoder 822 to obtain two decoded video streams. In some embodiments, depending on the viewing direction of the user of the display device 830, the decoder 822 may decode fewer than all video streams in the content item file 810. For example, if the playback device 820 determines that the lower hemisphere of the content item will not be viewed by the viewer based on the viewer's viewing direction, the video stream corresponding to the lower hemisphere may not be decoded.

In the example shown in FIG. 8, the resolutions of the two decoded streams are each 1920×1080. The decoded video streams are then stitched by the GPU 823 to form a combined image. In the example shown in FIG. 8, the resolutions of the combined video streams is 3840×1080. The GPU 824 may then adjust the combined image based on the display type and display resolution of the display device 830. In the example shown in FIG. 8, the resolutions of the combined video streams is reduced to 1920×1080 and stereoscopic images are generated for the display device 830. In some embodiments, the system may further adjust the image based on the warp and distortions associated with the display device 830. The adjusted combined video stream is then provided to the display device 830 for playback.

In the example shown in FIG. 8, the display device 830 comprises a head mounted display (HMD). In some embodiments, similar processes may also be used to generate images to display on other types of displays such as flat screen displays. In some embodiments, the GPU 823 and GPU 824 may comprise the same GPU. In some embodiments, the functionalities of the GPUs 823 and 824 may be implemented at the CPU 821 instead of a discrete GPU. In some embodiments, the GPUs 823 and 824 may comprise discrete RAMs separate from the RAMs used by the CPU 821. In some embodiments, the functionalities of the decoder 822 may be implemented on one or more of the CPU 821, the GPU 823, and the GPU 824.

While in FIGS. 7 and 8, the content item file 750 comprises two video streams, similar processes may be implemented with content files comprising three or more video streams. In some embodiments, depending on the view angle and/or area detected at the display device 830, the content item file 810 retrieved at the playback device 820 may contain fewer individually encoded video streams as compared to the content item file 750 initially generated by the capture device. For example, if the user's view area does not overlap the lower half of spherical view, the second video stream (corresponding to the video stream outputted from the camera processor 722) may not be received in the content item file 810. The system may further skip the stitching steps completely and merely adjust the image for display at the display device 830. In another example, if the capture device comprises a third image sensor and outputs a content item file 750 having three separately encoded video streams, the playback device 820 may only retrieve and stitch two out of the three video streams depending on the viewing angle and/or area of the user viewing the content on the display device 830.

In some embodiments, with the system as shown in FIGS. 7 and 8, the processing power requirements of the capture device may be significantly reduced as the capture device does not carry out the computationally demanding process of stitching video streams. The system may further use the commodity a camera controller and a memory controller to lower Bill of Material (BOM) cost. The system may also allow the resolution of the output file to scale depending on the number of cameras in the capture device. In some embodiments, a mobile, desktop, or cloud-based application may be provided to transcode the content item file 750 to common formats such as those used for sharing on social media (e.g. YouTube and Facebook). The IMU data recorded by the capture device can further be utilized to determine video stream(s) to decode at the playback device.

In some embodiments, one or more of the embodiments, methods, approaches, and/or techniques described above may be implemented in one or more computer programs or software applications executable by a processor based apparatus or system. By way of example, such processor based apparatus or systems may comprise a computer, entertainment system, game console, workstation, graphics workstation, server, client, portable device, pad-like device, etc. Such computer program(s) may be used for executing various steps and/or features of the above-described methods and/or techniques. That is, the computer program(s) may be adapted to cause or configure a processor based apparatus or system to execute and achieve the functions described above. For example, such computer program(s) may be used for implementing any embodiment of the above-described methods, steps, techniques, or features. As another example, such computer program(s) may be used for implementing any type of tool or similar utility that uses any one or more of the above described embodiments, methods, approaches, and/or techniques. In some embodiments, program code macros, modules, loops, subroutines, calls, etc., within or without the computer program(s) may be used for executing various steps and/or features of the above-described methods and/or techniques. In some embodiments, the computer program(s) may be stored or embodied on a computer readable storage or recording medium or media, such as any of the computer readable storage or recording medium or media described herein.

Therefore, in some embodiments the present invention provides a computer program product comprising a medium for embodying a computer program for input to a computer and a computer program embodied in the medium for causing the computer to perform or execute steps comprising any one or more of the steps involved in any one or more of the embodiments, methods, approaches, and/or techniques described herein. For example, in some embodiments the present invention provides one or more non-transitory computer readable storage mediums storing one or more computer programs adapted or configured to cause a processor based apparatus or system to execute steps comprising: determining a viewing direction of a user viewing a content item comprising a plurality of video streams, selecting two or more video streams of the content item based on the viewing direction of the user and directional data associated with the plurality of video streams, decoding the two or more video streams to form two or more decoded video streams, stitching the two or more decoded video streams to form a combined image, and causing the combined image to be displayed to the user.

While the invention herein disclosed has been described by means of specific embodiments and applications thereof, numerous modifications and variations could be made thereto by those skilled in the art without departing from the scope of the invention set forth in the claims.

What is claimed is:

1. A method for providing content comprising:
   determining a viewing direction of a user viewing a content item comprising a plurality of video streams;
   selecting two or more video streams of the content item based on the viewing direction of the user and directional data associated with the plurality of video streams, wherein the directional data was recorded by a capture system that recorded the content item;
   decoding the two or more video streams to form two or more decoded video streams;
   stitching the two or more decoded video streams to form a combined image, wherein the stitching comprises selectively stitching overlapping portions of the two or more decoded video streams that fall within a view area of the user when the view area of the user is in a first location and not stitching overlapping portions of the two or more decoded video streams that fall outside of the view area of the user when the view area of the user is in the first location; and
   causing the combined image to be displayed to the user.

2. The method of claim 1, wherein the content item comprises an omnidirectional video.

3. The method of claim 1, wherein the content item comprises a streaming video and wherein selecting the two or more video streams comprises retrieving only the selected video streams among the plurality of video streams.

4. The method of claim 1, wherein each of the plurality of video streams is captured by a separate camera in a multi-directional camera assembly.

5. The method of claim 1, wherein the viewing direction of the user comprises one or more of a head direction and a gaze direction.

6. The method of claim 1, further comprising: determining the view area based on the viewing direction.

7. The method of claim 6, wherein decoding the two or more video streams comprises selectively decoding portions of the two or more video streams that fall within the view area.

8. The method of claim 1, further comprising: adjusting the combined image based on parameters associated with a display device.

9. A system for providing content comprising:
   a video decoder;
   a graphic processor; and
   a central processor configured to:
      determine a viewing direction of a user viewing a content item comprising a plurality of video streams;
      selectively retrieve two or more video streams of the content item based on the viewing direction of the user and directional data associated with the plurality of video streams, wherein the directional data was recorded by a capture system that recorded the content item;
      cause the video decoder to decode the two or more video streams to form two or more decoded video streams;
      cause the graphic processor to stitch the two or more decoded video streams to form a combined image, wherein the stitching comprises selectively stitching overlapping portions of the two or more decoded video streams that fall within a view area of the user when the view area of the user is in a first location and not stitching overlapping portions of the two or more decoded video streams that fall outside of the view area of the user when the view area of the user is in the first location; and cause the combined image to be displayed to the user.

10. The system of claim 9, wherein the content item comprises an omnidirectional video.

11. The system of claim 9, wherein the content item comprises a streaming video and wherein selecting the two or more video streams comprises retrieving only the selected video streams among the plurality of video streams.

12. The system of claim 9, wherein each of the plurality of video streams is captured by a separate camera in a multi-directional camera assembly.

13. The system of claim 9, wherein the viewing direction of the user comprises one or more of a head direction and a gaze direction.

14. The system of claim 9, the central processor is further configured to determine the view area based on the viewing direction.

15. The system of claim 14, wherein the video decoder decodes the two or more video streams by selectively decoding portions of the two or more video streams that fall within the view area.

16. The system of claim 9, wherein the central processor is further configured to cause the combined image to be adjusted based on parameters associated with a display device.

17. A non-transitory computer readable storage medium storing one or more computer programs configured to cause a processor based system to execute steps comprising:

determining a viewing direction of a user viewing a content item comprising a plurality of video streams;

selecting two or more video streams of the content item based on the viewing direction of the user and directional data associated with the plurality of video streams, wherein the directional data was recorded by a capture system that recorded the content item;

decoding the two or more video streams to form two or more decoded video streams;

stitching the two or more decoded video streams to form a combined image, wherein the stitching comprises selectively stitching overlapping portions of the two or more decoded video streams that fall within a view area of the user when the view area of the user is in a first location and not stitching overlapping portions of the two or more decoded video streams that fall outside of the view area of the user when the view area of the user is in the first location; and causing the combined image to be displayed to the user.

18. An apparatus for capturing content comprising:

a plurality of cameras forming a multi-directional camera assembly;

at least one inertial measurement unit coupled to the multi-directional camera assembly;

a video encoder;

a memory device; and a processor configured to:

cause the plurality of cameras to capture a plurality of video streams;

record directional data for the plurality of video streams based on the at least one inertial measurement unit;

cause the video encoder to separately encode each of the plurality of video streams; and store, in the memory device, a plurality of encoded video streams and the directional data for playback by a playback device;

wherein the playback device is configured to selectively stitch overlapping portions of two or more decoded video streams that fall within a view area of a user when the view area of the user is in a first location and not stitch overlapping portions of the two or more decoded video streams that fall outside of the view area of the user when the view area of the user is in the first location.

19. The apparatus of claim 18, further comprising: a communication device configured to stream the plurality of encoded video streams and the directional data to a server accessible by the playback device.

* * * * *